United States Patent
Amagai

(10) Patent No.: US 9,349,557 B2
(45) Date of Patent: May 24, 2016

(54) FUNCTION DRIVING APPARATUS, FUNCTION DRIVING METHOD, AND COMPUTER-READABLE STORAGE MEDIUM HAVING FUNCTION DRIVING PROGRAM THEREON

(71) Applicant: CASIO COMPUTER CO., LTD., Shibuya-ku, Tokyo (JP)

(72) Inventor: Hitoshi Amagai, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 469 days.

(21) Appl. No.: 14/019,947

(22) Filed: Sep. 6, 2013

(65) Prior Publication Data

US 2014/0077625 A1 Mar. 20, 2014

(30) Foreign Application Priority Data

Sep. 19, 2012 (JP) .................................. 2012-205727

(51) Int. Cl.
| | | |
|---|---|---|
| *H01H 35/14* | (2006.01) | |
| *G06F 1/16* | (2006.01) | |
| *G06F 1/32* | (2006.01) | |

(52) U.S. Cl.
CPC ............. *H01H 35/141* (2013.01); *G06F 1/163* (2013.01); *G06F 1/3265* (2013.01); *Y02B 60/1242* (2013.01); *Y10T 307/799* (2015.04)

(58) Field of Classification Search
CPC H01H 35/141; G06F 1/3265; Y10T 307/799; Y02B 60/1242
See application file for complete search history.

(56) References Cited

U.S. PATENT DOCUMENTS

2005/0145774 A1 7/2005 Yang et al.

FOREIGN PATENT DOCUMENTS

| JP | 09-120323 A | 5/1997 |
|---|---|---|
| JP | 09-257965 A | 10/1997 |
| JP | 2000-148351 A | 5/2000 |
| JP | 2001-159951 A | 6/2001 |
| JP | 2002-354097 A | 12/2002 |
| JP | 2003-163742 A | 6/2003 |
| JP | 2003-179686 A | 6/2003 |
| JP | 2005-198235 A | 7/2005 |
| JP | 2006-163294 A | 6/2006 |
| JP | 2006-174340 A | 6/2006 |
| JP | 2007-041143 A | 2/2007 |
| JP | 2010-009498 A | 1/2010 |
| JP | 2011-059572 A | 3/2011 |
| JP | 2011-142497 A | 7/2011 |
| JP | 2011-182080 A | 9/2011 |
| JP | 2012-199259 A | 10/2012 |

*Primary Examiner* — Daniel Cavallari
(74) *Attorney, Agent, or Firm* — Holtz, Holtz & Volek PC

(57) ABSTRACT

A function driving apparatus of the present invention includes an acceleration sensor which detects acceleration components of a device in directions of x axis, y axis, and z axis which are orthogonal to each other, at every predetermined time interval; and a control section which transforms, at every predetermined time interval, the acceleration components detected by the acceleration sensor to polar coordinate components formed of an r component representing a distance from an origin of an xyz space, a θ component representing an angle formed with the x axis, and a φ component representing an angle formed with an xy plane including the x axis and the y axis, and drives a specific function of the device when a state in which the θ component and the φ component are within a predetermined set range continues for a predetermined time or longer.

12 Claims, 8 Drawing Sheets

VIEW FIELD
DIRECTION OF
DISPLAY SURFACE
(-Z DIRECTION)

FUNCTION DRIVING APPARATUS, FUNCTION DRIVING METHOD, AND COMPUTER-READABLE STORAGE MEDIUM HAVING FUNCTION DRIVING PROGRAM THEREON

CROSS-REFERENCE TO RELATED APPLICATION

This application is based upon and claims the benefit of priority from the prior Japanese Patent Application No. 2012-205727, filed Sep. 19, 2012, the entire contents of which are incorporated herein by reference.

BACKGROUND OF THE INVENTION

1. Field of the Invention

The present invention relates to a function driving apparatus, a function driving method, and a computer-readable storage medium having a function driving program stored thereon, which are applicable to a portable device.

2. Description of the Related Art

Conventionally, portable electronic devices including a display device have been known, such as a wristwatch, a portable telephone, a smartphone, and a media player. These electronic devices are often provided with a light source such as a backlight for clarity of display in the display device and for ease of viewability. However, since most of the portable electronic devices are driven by a battery incorporated therein, there is a problem in that exhaustion of the battery is severe by driving the light source, whereby the driving time of the electronic device is shortened and the convenience is degraded. To solve these problems, various technologies have been developed and put to practical use in order to achieve both convenience of the portable electronic device and long life of the battery.

For example, Japanese Patent Application Laid-Open (Kokai) Publication No. 09-257965 describes a wristwatch having a tilt switch and an acceleration switch incorporated therein, where a display panel (an EL panel) is lit up when the wristwatch is tilted at a predetermined angle based on outputs from both of these switches. Also, Japanese Patent Application Laid-Open (Kokai) Publication No. 2011-142497 describes a technique in which a backlight is lit up when a portable terminal is tilted at a predetermined angle based on an output from an acceleration sensor incorporated in the portable terminal.

However, in Japanese Patent Application Laid-Open (Kokai) Publication No. 09-257965, the tilt switch and the acceleration switch are both required to be provided to control the display panel to light up, and therefore there is a problem in that the number of components is increased, whereby the size of the electronic device and the product cost are increased.

On the other hand, in Japanese Patent Application Laid-Open (Kokai) Publication No. 2011-142497, the backlight is controlled to light up only with the output from the acceleration sensor. In this case, processing for detecting the tilt of the portable terminal in a stationary state (or substantially in a stationary state) is performed. Normally, the portable electronic device (portable terminal) is always carried by a user or mounted on a human body for use. For this reason, for example, when the user is performing continuous motions or workout such as walking or running, an accurate tilt of the portable terminal cannot be detected and the backlight may erroneously operate in the scheme disclosed in Japanese Patent Application Laid-Open (Kokai) Publication No. 2011-142497. Moreover, to prevent this erroneous operation, the user has to once suspend or stop the motions or workout to cause the portable terminal to stay still, by which the convenience is degraded.

SUMMARY OF THE INVENTION

In accordance with one aspect of the present invention, there is provided a function driving apparatus comprising: an acceleration sensor which detects acceleration components of a device in directions of x axis, y axis, and z axis which are orthogonal to each other, at every predetermined time interval; and a control section which transforms, at every predetermined time interval, the acceleration components detected by the acceleration sensor to polar coordinate components formed of an r component representing a distance from an origin of an xyz space, a θ component representing an angle formed with the x axis, and a φ component representing an angle formed with an xy plane including the x axis and the y axis, and drives a specific function of the device when a state in which the θ component and the φ component are within a predetermined set range continues for a predetermined time or longer, wherein the control section judges whether the θ component or the φ component is within the predetermined set range, at every predetermined time interval; increments a first coefficient when the θ component and the φ component are within the predetermined set range: increments a second coefficient and decrements the first coefficient when the θ component or the φ component is out of the predetermined set range; and drives the specific function of the device based on a result of comparison between the first coefficient and a first preset value.

In accordance with another aspect of the present invention, there is provided a function driving method comprising: a step of detecting acceleration components of a device in directions of x axis, y axis, and z axis which are orthogonal to each other, at every predetermined time interval; and a step of transforming, at every predetermined time interval, the acceleration components detected by an acceleration sensor to polar coordinate components formed of an r component representing a distance from an origin of an xyz space, a θ component representing an angle formed with the x axis, and a φ component representing an angle formed with an xy plane including the x axis and the y axis, and driving a specific function of the device when a state in which the θ component and the φ component are within a predetermined set range continues for a predetermined time or longer, wherein the step of driving the specific function of the device includes a step of judging whether the θ component or the φ component is within the predetermined set range, at every predetermined time interval, a step of incrementing a first coefficient when the θ component and the φ component are within the predetermined set range, a step of incrementing a second coefficient and decrementing the first coefficient when the θ component or the φ component is out of the predetermined set range, and a step of driving the specific function of the device based on a result of comparison between the first coefficient and a first preset value.

In accordance with another aspect of the present invention, there is provided a non-transitory computer-readable storage medium having stored thereon a function driving program that is executable by a computer, the program being executable by the computer to control a function driving apparatus having an acceleration sensor for detecting acceleration components of a device in directions of x axis, y axis, and z axis which are orthogonal to each other at every predetermined time interval, and to perform functions comprising: processing for transforming, at every predetermined time interval, the acceleration components detected by the acceleration sensor to polar coordinate components formed of an r component representing a distance from an origin of an xyz space, a θ component representing an angle formed with the x axis, and a φ component representing an angle formed with an xy plane including the x axis and the y axis, and driving a specific function of the device when a state in which the θ component and the φ component are within a predetermined set range continues for a predetermined time or longer, wherein the processing for driving the specific function of the device includes processing for judging whether the θ component or the φ component is within the predetermined set range, at every predetermined time interval, processing for incrementing a first coefficient when the θ component and the φ component are within the predetermined set range, processing for incrementing a second coefficient and decrementing the first coefficient when the θ component or the φ component is out of the predetermined set range, and processing for driving the specific function of the device based on a result of comparison between the first coefficient and a first preset value.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Regarding a function driving apparatus, a function driving method, and a function driving program according to the present invention, a tilt judging apparatus, a tilt judging method, and a tilt judging program are described in detail below as an embodiment. Here, as an embodiment, a portable electronic device to which the function driving apparatus (tilt judging apparatus) according to the present invention has been applied is depicted, and description is made to the case where a device user wearing the electronic device makes motions or a workout such as walking or running.

(Electronic Device)

Figure 1A:
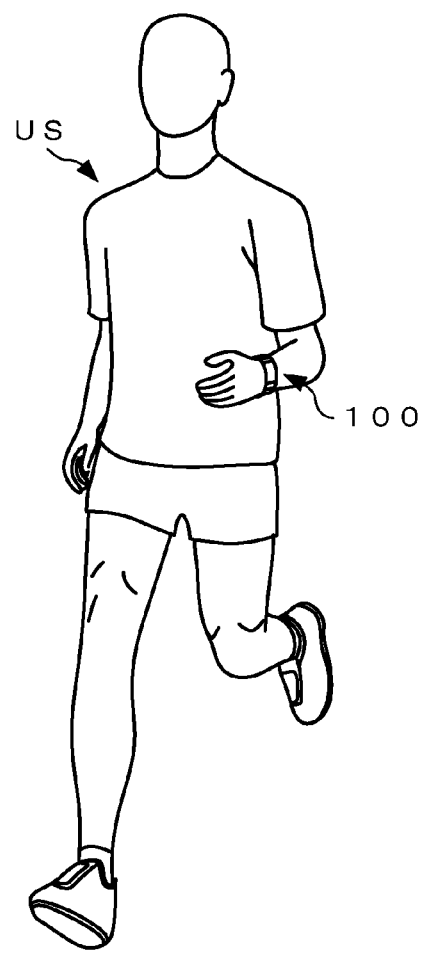
FIG. 1A and FIG. 1B are schematic structural diagrams of an embodiment of a portable electronic device to which a tilt judging apparatus according to the present invention has been applied.
Figure 1B:
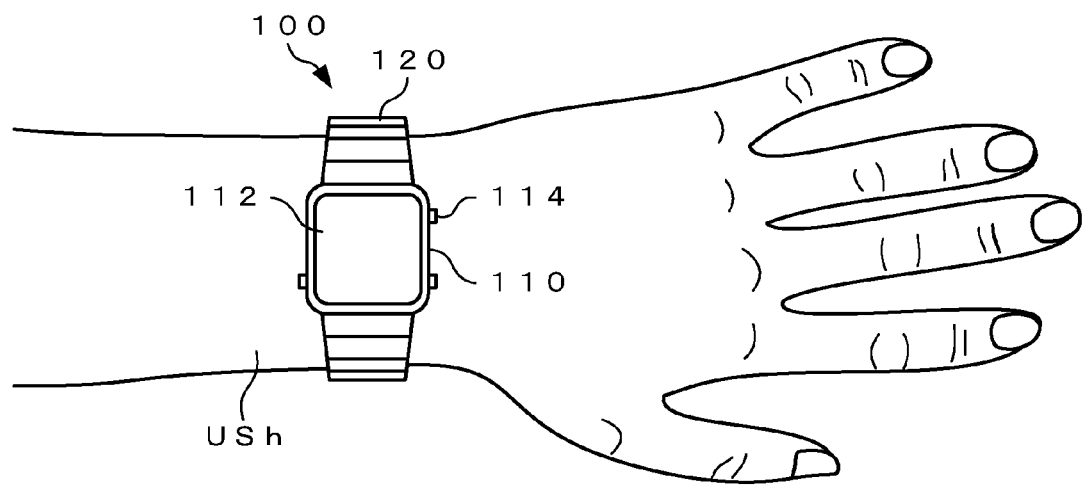

FIG. 1A and FIG. 1B are schematic structural diagrams of an embodiment of a portable electronic device to which a tilt judging apparatus according to the present invention has been applied. Here, FIG. 1A is a schematic view of the state where the electronic device according to the present embodiment has been mounted on a human body, and FIG. 1B is a block diagram showing an example of the structure of the electronic device according to the present embodiment.

A portable electronic device 100 to which the tilt judging apparatus according to the present invention has been applied has, for example, an outer appearance in the form of a wristwatch (or a wristband) mounted on a wrist or the like of a user US, as depicted in FIG. 1A and FIG. 1B. The electronic device 100 mainly includes, for example, a device body 110 including a display section 112 for providing predetermined information to the user and a belt section 120 for mounting the device body 110 on a wrist of the user US by being wound around the wrist, as depicted in FIG. 1B.

Figure 2:
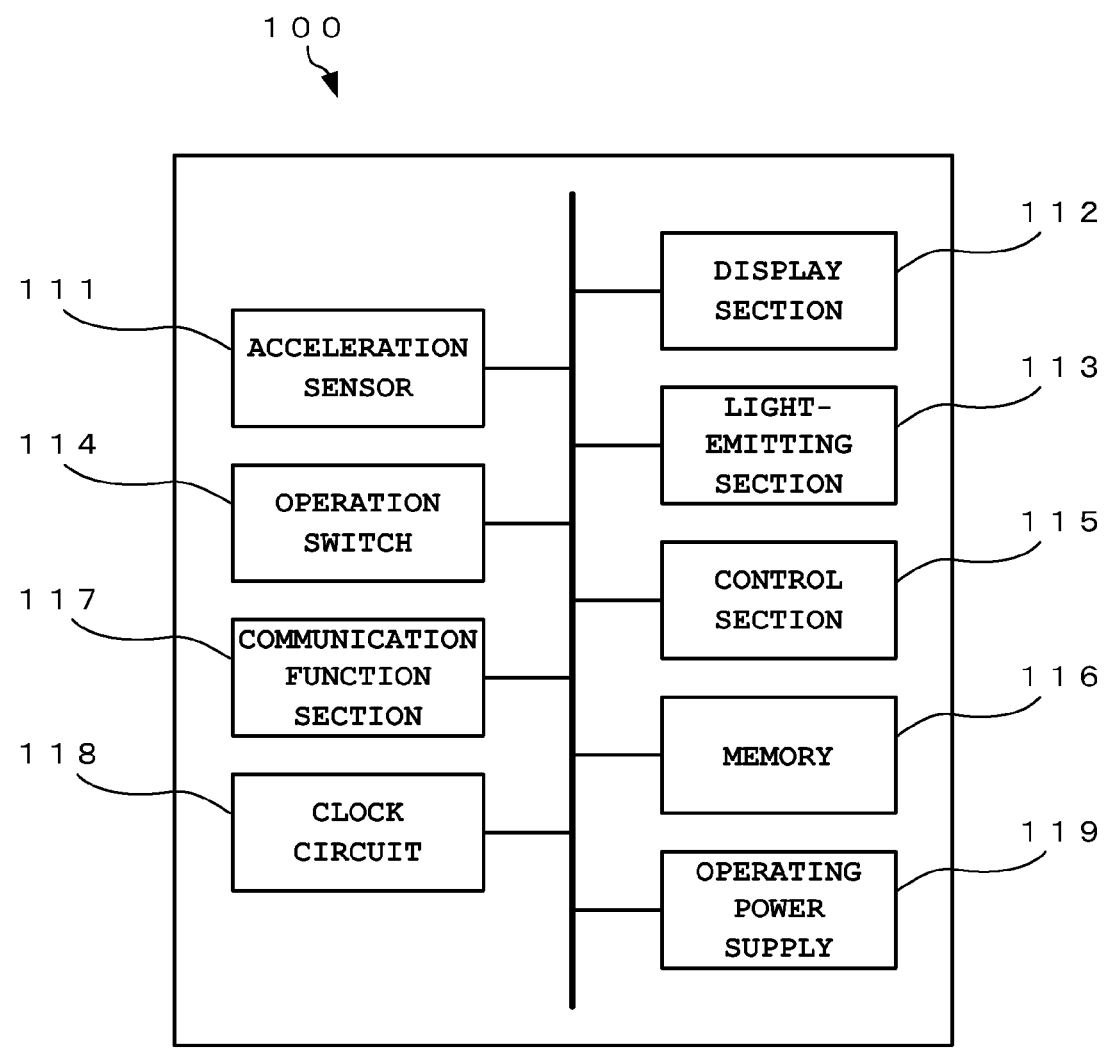
FIG. 2 is a block diagram showing an example of the structure of an electronic device according to an embodiment.

Specifically, the electronic device 100 mainly includes an acceleration sensor 111, the display section 112, a light-emitting section 113, an operation switch 114, a central computing circuit (hereinafter abbreviated as a "control section") 115, a memory 116, a communication function section 117, a clock circuit 118, and an operating power supply 119, as depicted in FIG. 2.

The acceleration sensor 111 detects a ratio in change of a moving speed (acceleration) that is applied to the electronic device 100 (acceleration) when the user US is performing, for example, motions or a workout, as acceleration data. The acceleration data detected by the acceleration sensor 111 is outputted as components in directions of three axes, that is, an X axis, a Y axis, and a Z axis, as will be described further below. This acceleration data is stored in a predetermined storage area of the memory 116 in association with time information outputted from the clock circuit 118.

The display section 112 has a display panel such as a reflective-type or transmission-type liquid-crystal display panel capable of color or monochrome display, and displays desired information such as a current time or workout information at least while the user is performing motions or a workout. The light-emitting section 113 is provided on the front surface side or the back surface side of the display panel of the display section 112, and light from the light-emitting section 113 is applied to the display panel. Here, in a case where the display section 112 includes a reflective-type display panel, the light-emitting section 113 is placed on the front surface side of the display panel as a front light. On the other hand, in a case where the display section 112 includes a transmission-type display panel, the light-emitting section 113 is placed on the back surface side of the display panel as a back light. In the present embodiment, the display section 112 and the light-emitting section 113 have different structures. However, a configuration may be adopted in which a light-emitting display section having a self-light-emitting display panel such as an organic EL display panel is provided and, in place of the display section 112 and the light-emitting section 113, the display panel itself emits light to display desired information.

The operation switch 114 is, for example, a button switch as depicted in FIG. 1B or a slide switch, and/or has a touch panel or the like placed on or integrally formed with the front surface of the display section 112. The operation switch 114 is used for selecting and performing various operations and operating input settings or the like in the electronic device 100. For example, by operating the operation switch 114, supply of driving electric power from the operating power supply 119 to each component inside the electronic device 100 (turning power supply ON), cutoff of the driving electric power (turning power supply OFF), a sensing operation at the acceleration sensor 111, a display operation at the display section 112, and the like are controlled.

The memory 116 has a non-volatile memory, which has a predetermined storage area where at least various data that are detected, generated, or referred to in association with the operation of a light-source control method (will be described below in detail) performed for the electronic device 100 are stored. Here, the memory 116 may include a read-only memory (ROM) having stored therein a control program for achieving a predetermined function at each of the acceleration sensor 111, the display section 112, the light-emitting section 113, the memory 116, the communication function section 117, and the clock circuit 118 and an algorithm program for achieving the light-source control method including a tilt judging method, which will be described further below.

The control section 115 executes a predetermined control program based on a basic clock generated at the clock circuit 118 to control each operation of the acceleration sensor 111, the display section 112, the light-emitting section 113, the memory 116, and the communication function section 117 and achieve a predetermined function. Also, by performing a predetermined algorithm program, the control section 115 achieves the light-source control method including the tilt judging method according to the present invention. These control program and algorithm program may be stored in the memory 116 described above or may be incorporated in the control section 115 in advance.

The communication function section 117 transmits various data to an external information communication device omitted in the drawings in a predetermined communication mode. As an external information communication device, for example, a device may be applied which supports Bluetooth (registered trademark), which is a short-range wireless communication standard for digital devices, or Bluetooth (registered trademark) low energy planned as a low power consumption type in the communication standard described above. Also, as another transmission method applicable to the present embodiment, in addition to a method by wireless communication, a wired communication method may be applied in which, for example, the electronic device 100 and the external information communication device are directly connected via a communication cable.

The clock circuit 118 has an oscillator which generates a basic clock. Based on the basic clock, the clock circuit 118 generates an operation clock which defines the operation timing of each component of the electronic device 100 and generates time information indicating a current time for output. The time information is displayed as a current time on the display section 112, and stored in the memory 116 in association with the acceleration data collected by the acceleration sensor 111 described above or other data.

The operating power supply 119 supplies driving electric power to each component inside the electronic device 100. As the operating power supply 119, in addition to a primary battery such as a commercially-available coin-shaped battery or button-shaped battery or a secondary battery such as a lithium-ion battery or a nickel-metal-hydride battery, a power supply by energy harvest technology for generating electricity by energy such as vibrations, light, heat, electro-magnetic waves may be applied.

(Light-Source Control Method for Electronic Device)

Next, a light-source control method for electronic devices to which the tilt judging method according to the present invention has been applied is described. In the following, the light-source control method is described in the case where, while performing a workout such as running or running in a marathon as an example of motions or a workout with the portable electronic device 100 according to the present embodiment mounted on the wrist, the user visually checks information displayed on the display section 112 of the electronic device 100.

Figure 3:
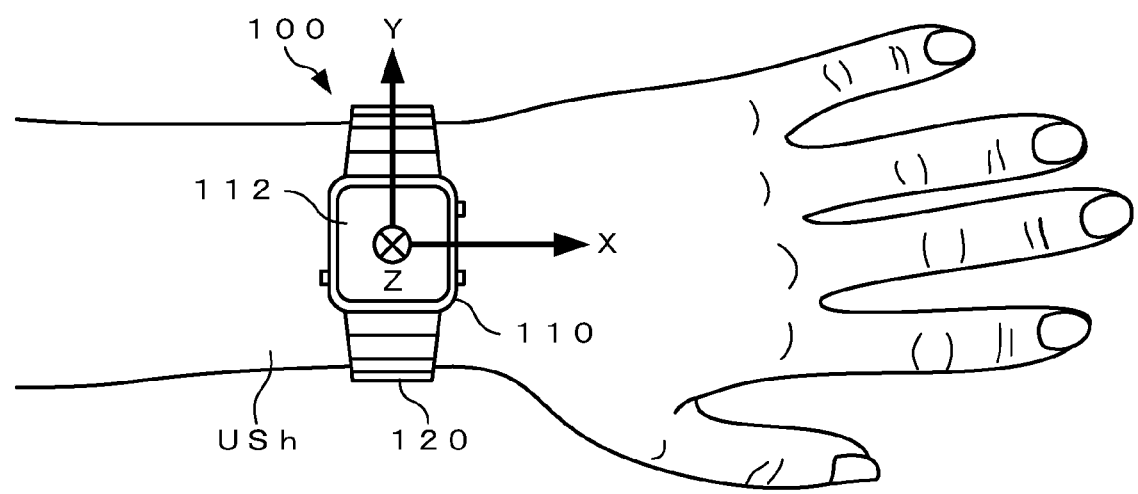
FIG. 3 is a schematic view showing an example of an output component of sensor data applied to a light-source control method for an electronic device to which a tilt judging method according to the present invention is applied.
Figure 4:
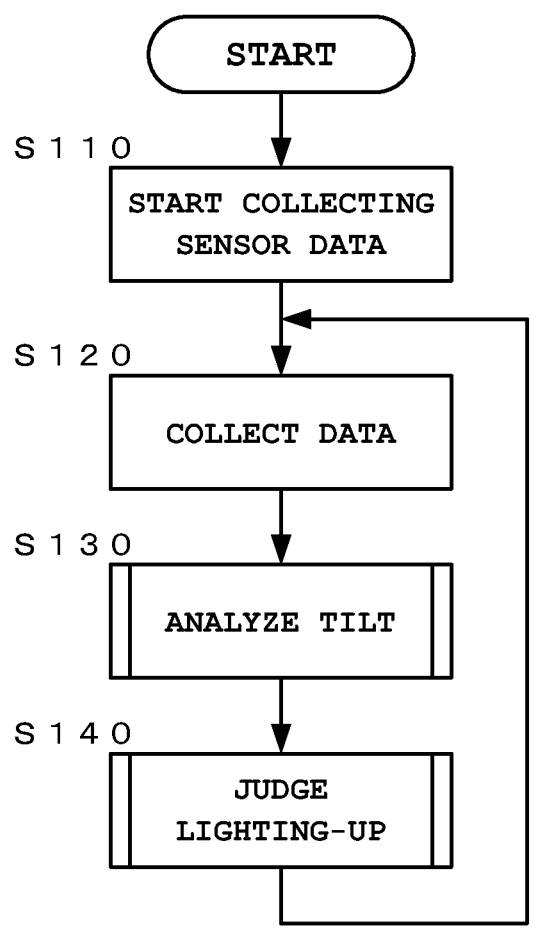
FIG. 4 is a flowchart of a schematic operation of the light-source control method according to the embodiment.
Figure 5:
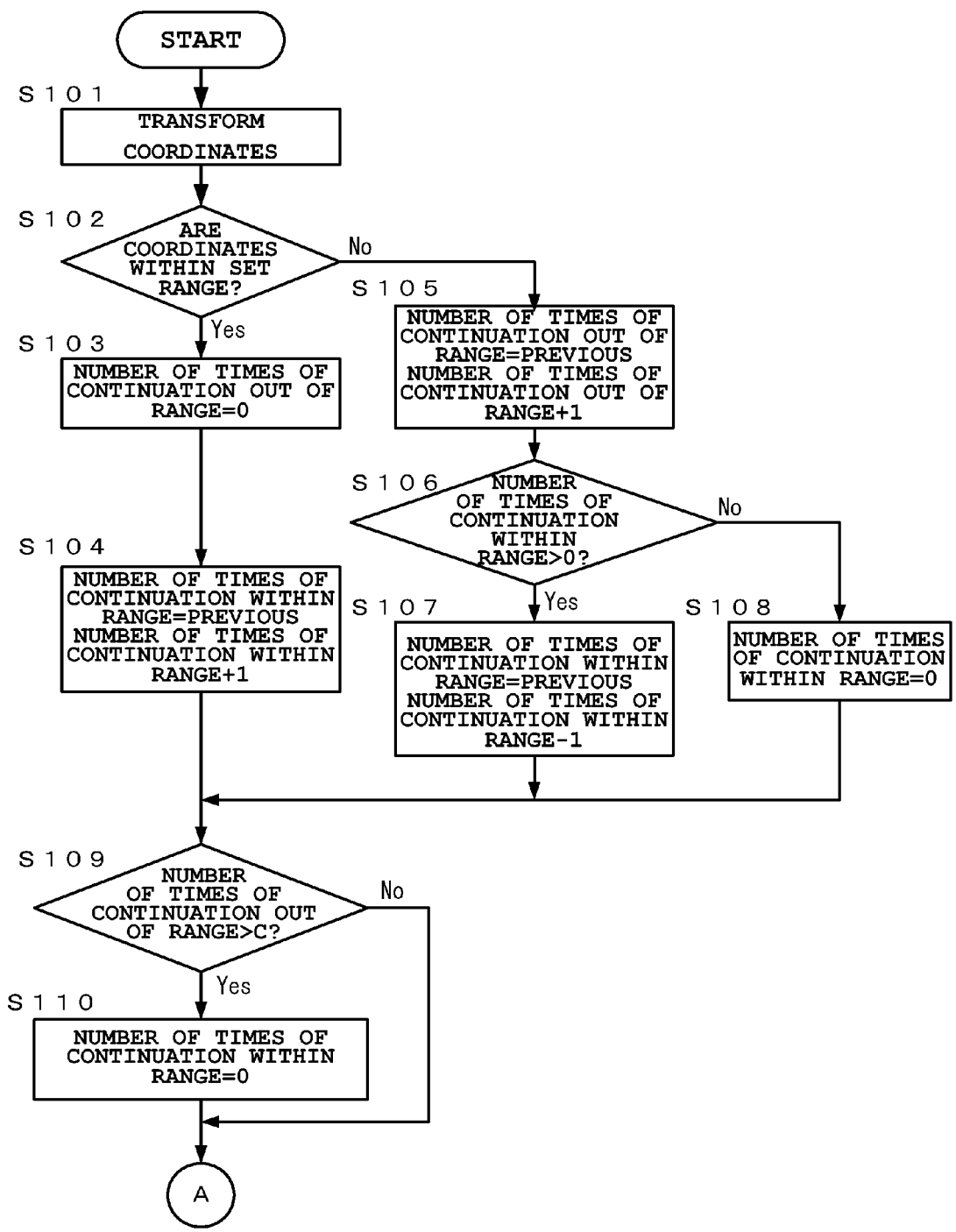
FIG. 5 is a first flowchart of analysis and judgment processing in the light-source control method according to the embodiment.
Figure 6:
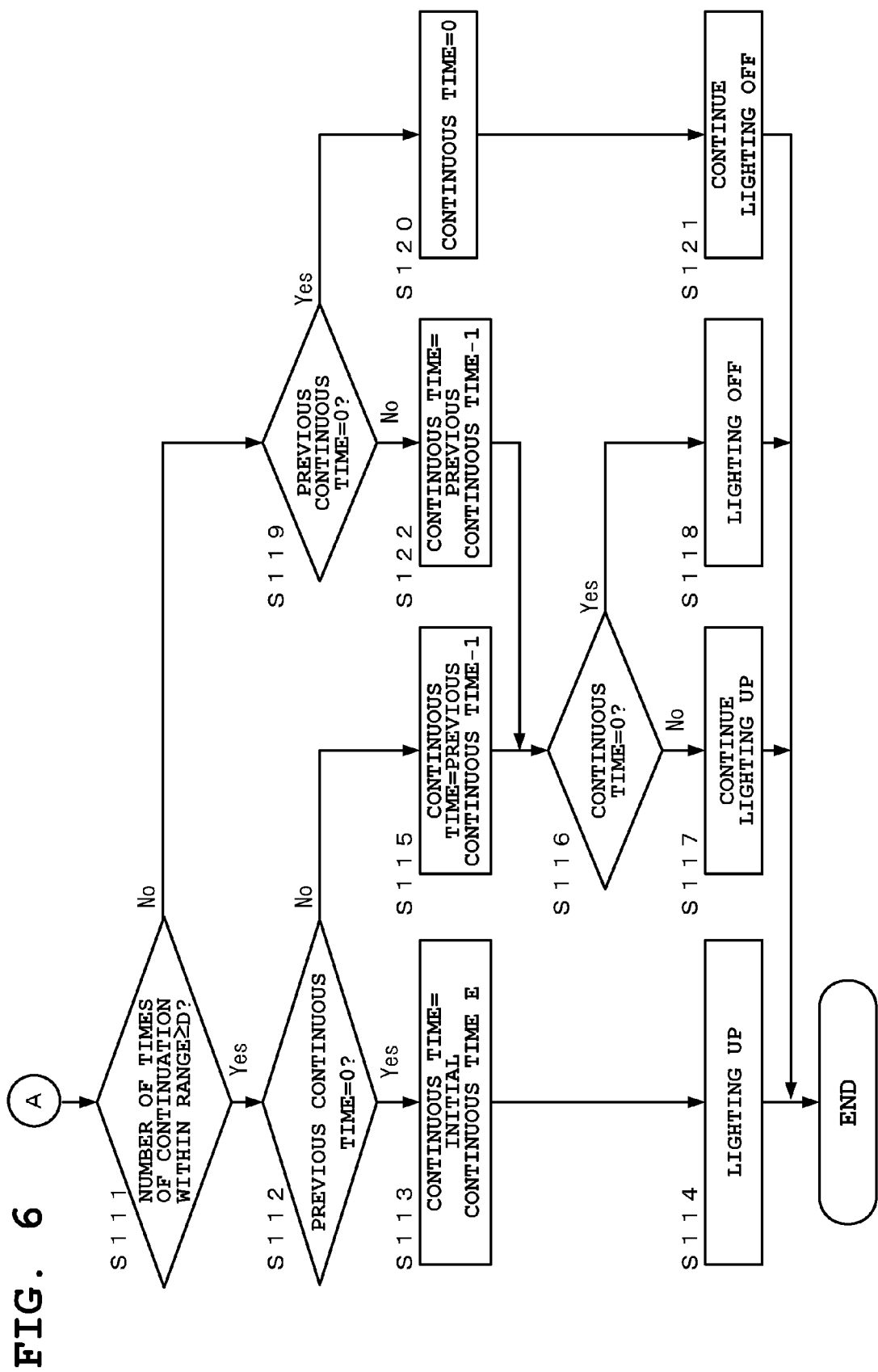
FIG. 6 is a second flowchart of the analysis and judgment processing in the light-source control method according to the embodiment.
Figure 7:
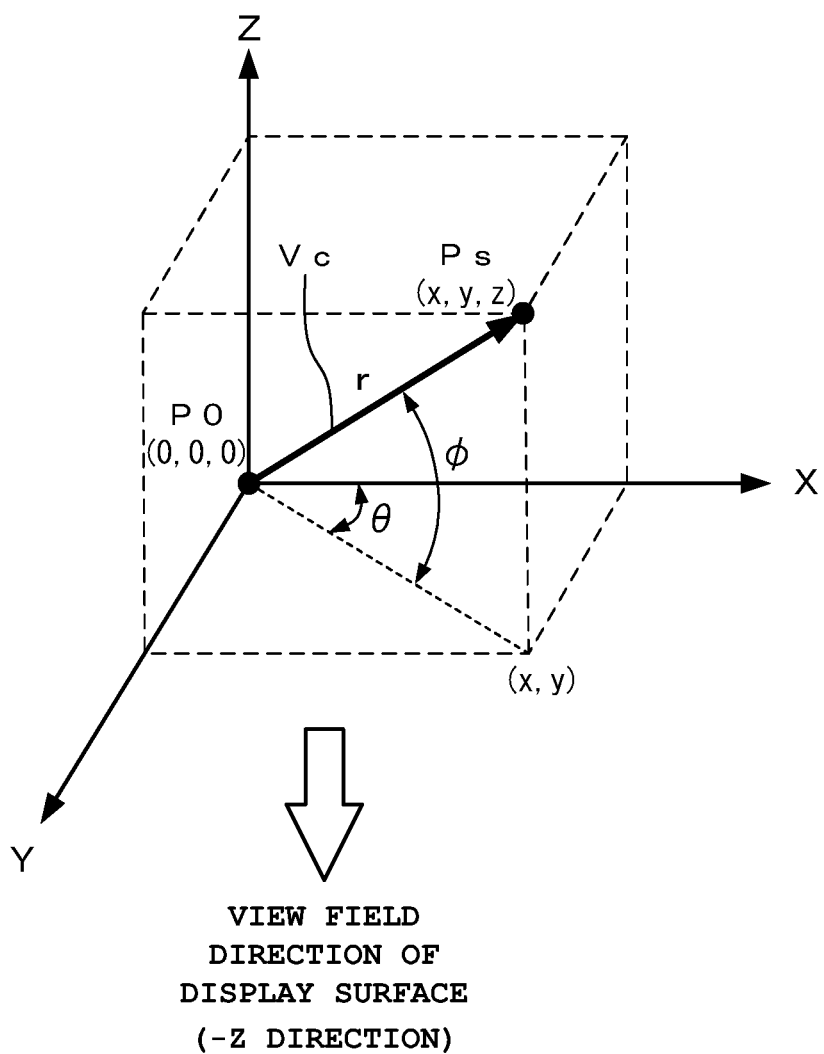
FIG. 7 is a schematic view for describing coordinate transformation processing applied to the light-source control method according to the embodiment.
Figure 8A:
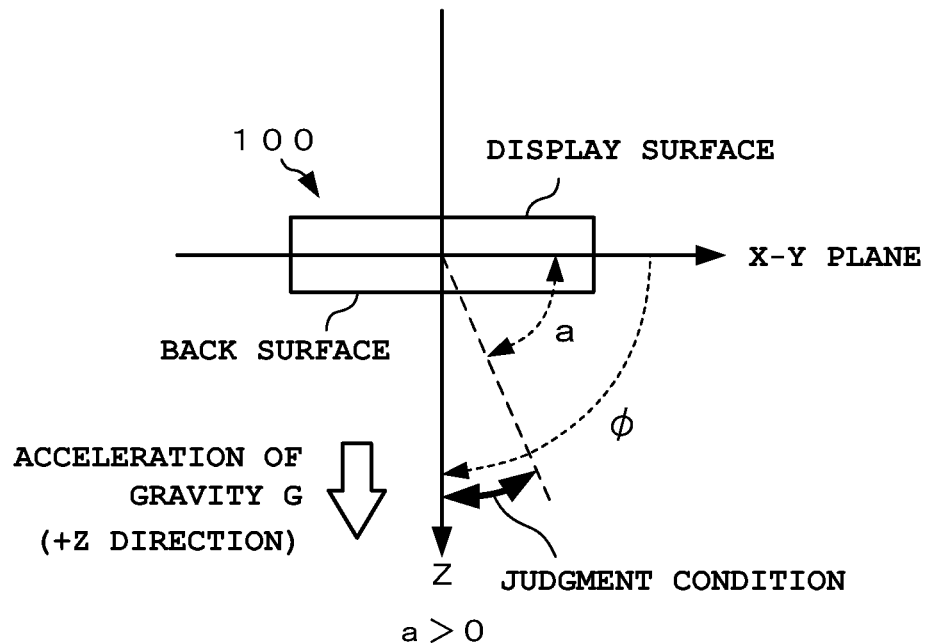
FIG. 8A and FIG. 8B are schematic views for describing range judgment processing applied to the light-source control method according to the embodiment.
Figure 8B:
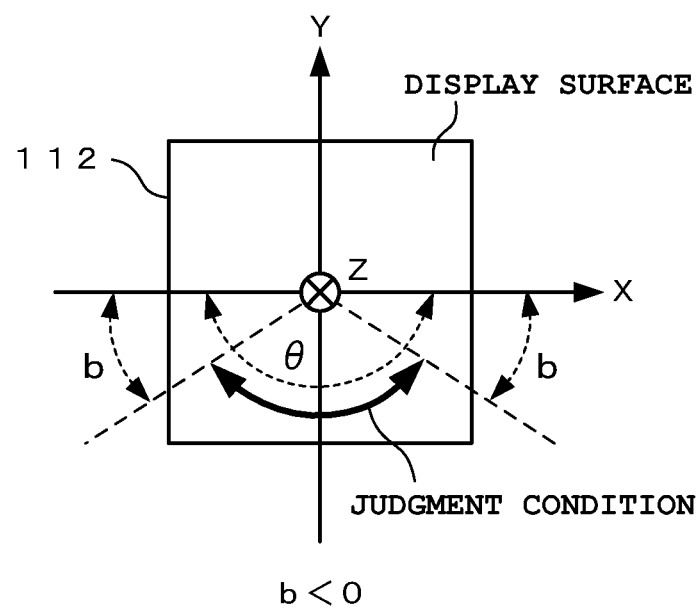

FIG. 3 is a schematic view showing an example of an output component of sensor data applied to a light-source control method for an electronic device to which a tilt judging method according to the present invention has been applied. FIG. 4 is a flowchart of a schematic operation of the light-source control method according to the embodiment. FIG. 5 and FIG. 6 are flowcharts of analysis and judgment processing in the light-source control method according to the embodiment. FIG. 7 is a schematic view for describing coordinate transformation processing applied to the light-source control method according to the embodiment. FIG. 8A and FIG. 8B are schematic views for describing range judgment processing applied to the light-source control method according to the embodiment.

First, output components of sensor data is described that is applied to the light-source control method for electronic devices to which the tilt judging method according to the present invention has been applied.

In the present embodiment, as a scheme for detecting the tilt of the electronic device 100, a triaxial acceleration sensor is used, by which output components in directions of orthogonal three axes of X, Y, and Z are collected. That is, in the present embodiment, acceleration data detected by the acceleration sensor 111 incorporated in the electronic device 100 mounted on a wrist USh of the user as depicted in FIG. 1B is outputted as components of directions of three axes of X, Y, and Z orthogonal to each other which are set, for example, as depicted in FIG. 3. Here, for the output components from the acceleration sensor 111, with the electronic device 100 being mounted such that the display surface of the display section 112 of the electronic device 100 is placed on the back of the left wrist USh of the user as depicted in FIG. 3, a direction from the wrist USh toward the fingertips (the right direction in the drawing) is set as a + (plus) direction on the x axis, a direction from the thumb on the back of the wrist USh toward the little finger (the upper direction in the drawing) is set as a + direction of the y axis, and a direction from the back of the wrist USh toward the palm (the depth direction from the surface of the drawing) is set as a + direction of the z axis. That is, in the present embodiment, the acceleration sensor 111 is placed such that the display surface of the display section 112 of the electronic device 100 matches an X-Y plane including the X axis and the Y axis of the output components from the acceleration sensor 111 and the Z axis of the output components from the acceleration sensor 111 matches a direction perpendicular to the display surface.

Note that the settings of the directions (directions of X, Y, and Z axes) of the output components from the acceleration sensor 111 depicted in FIG. 3 are merely an example set for convenience in order to simplify the description of the tilt judging method according to the present embodiment, and the present invention is not limited thereto. That is, the X-Y plane including the X axis and the Y axis of the output components from the acceleration sensor 111 may not match the display surface of the display section 112. In this case, in coordinate transformation processing which will be described further below, coordinate transformation is performed such that the X-Y plane including the X axis and the Y axis of the output components matches the display surface of the display section 112, whereby the tilt judging method according to the present embodiment can be achieved.

The light-source control method for electronic devices according to the present embodiment mainly includes a sensor data collection start operation S110, a data collecting operation S120, a tilt analyzing operation S130, and a lighting-up judging operation S140 as depicted in FIG. 4.

Each operation of the light-source control method is specifically described below.

First, in the sensor data collection start operation S110, the electronic device 100 is activated to start an operation of collecting acceleration data (sensor data) by the acceleration sensor 111. Specifically, by the user US operating the operation switch 114 of the electronic device 100 mounted on the wrist USh, the control section 115 causes the acceleration sensor 111 to start a sensing operation of detecting acceleration that is a ratio in change of a moving speed applied to the electronic device 100 while the user is performing a workout. Here, the sensor data collection start operation may be started by the user operating the operation switch 114 described above or may be started in conjunction with the start of the electronic device 100, after which the sensor data collection is continuously performed.

Then, in the data collecting operation S120, the acceleration data collected by the acceleration sensor 111 is stored in the predetermined storage area of the memory 116 in association with the time information outputted from the clock circuit 118. Here, the acceleration data is detected by the acceleration sensor 111 at every predetermined time interval. Specifically, the acceleration data is collected at a period of, for example, 40 Hz (that is, every time interval of 0.025 sec (=25 msec)).

Next, in the tilt analyzing operation S130 and the lighting-up judging operation S140, as depicted in FIG. 5 and FIG. 6, the control section 115 analyzes the collected acceleration data to judge a tilt status of the electronic device 100, and performs a series of processing for controlling the light-emitting section 113 to light up.

In the tilt analyzing operation S130, as depicted in FIG. 5, the control section 115 first performs polar coordinate transformation on the acceleration data obtained as the output components in rectangular coordinates in directions of three axes of X, Y, and Z (Step S101). Specifically, as depicted in FIG. 7, the acceleration data detected by the acceleration sensor 111 is first represented as a synthetic vector Vc generated based on the output components of the directions of orthogonal three axes, the starting point of the synthetic vector Vc is set as an origin P0 (0, 0, 0), and the end point is set as a measurement point Ps (x, y, z). Then, a distance from the origin P0 (0, 0, 0), which is the starting point of the synthetic vector Vc, to the measurement point Ps (x, y, z), which is the end point, is set as r. An angle formed by a line connecting a point (x, y) of the measurement point Ps (x, y, z) projected onto the X-Y plane and the origin P0 (0, 0, 0) and the X axis is set as θ, and an angle formed by a line connecting the measurement point Ps (x, y, z) and the origin P0 (0, 0, 0) (that is, the synthetic vector Vc) and the X-Y plane is set as φ. In this case, computational expressions when the rectangular coordinates are subjected to coordinate transformation to polar coordinates [(x, y, z)→(r, φ, θ)] can be represented as the following equations (11) to (13). Here, 0≤r<∞, −(π/2)<φ≤π/2, and −π<θ≤π, and radians are used for representing angles. Also, x=r·cos φ·cos θ, y=r·cos φ·sin θ, and z=r·sin φ.

$$r = (x^2 + y^2 + z^2)^{\frac{1}{2}} \quad (11)$$

$$\theta = \tan^{-1}\frac{y}{x} \quad (12)$$

$$\phi = \tan^{-1}\frac{z}{(x^2 + y^2)^{\frac{1}{2}}} \quad (13)$$

As described above, the method of setting axes of rectangular coordinates and polar coordinates depicted in FIG. 7 is merely an example for simplifying the description in the present embodiment, and the present invention is not limited thereto. That is, in FIG. 7, the case is described where the X-Y plane including the X axis and the Y axis of the output components from the acceleration sensor 111 matches the display surface of the display section 112 and the Z axis is set to be perpendicular to the display surface. However, the X-Y surface may not match the display surface. In this case, in the coordinate transformation processing described above, coordinate transformation is performed such that the X-Y plane matches the display surface of the display section 112.

Next, as depicted in FIG. 5, the control section 115 judges whether the angles φ and θ, which are polar coordinate components of the acceleration data obtained by coordinate transformation, are within a range set in advance (Step S102). Specifically, if the angle φ with respect to the display surface (the X-Y plane) is larger than a judgment value a (φ>a) as depicted in FIG. 8A and the angle θ with respect to the X axis satisfies a condition of having a predetermined relation with a judgment value b (−π−b<θ<b), it is judged that the electronic device 100 is in a predetermined tilt state and the user US performs a motion for viewing the display surface of the electronic device 100. Here, the judgment values a and b are set as, for example, a=0.9 and b=−0.4. The above conditional expression for the judgment value a is applied in the case of a>0 as depicted in FIG. 8A. On the other hand, if the direction of the Z axis depicted in FIG. 7 is set as an opposite direction (a reverse direction), since it is the case of a<0, a conditional expression of φ<a is applied. Also, the above conditional expression for the judgment value b is applied in the case of −π/2<b<0 as depicted in FIG. 8B. On the other hand, if the direction of the Y axis depicted in FIG. 7 is set as an opposite direction (a reverse direction), since it is the case of 0<b<π/2, a conditional expression of b<θ<π−b is applied.

Range judgment regarding the angles φ and θ serving as the polar coordinate components described above is now described in detail.

First, the conditional expression of φ>a is described. As depicted in FIG. 7 and FIG. 8A, the predetermined judgment value a is set to the angle φ formed by the line connecting a point (r, φ, θ) obtained by polar coordinate transformation of the measurement values (that is, a measurement point Ps (x, y, z)) of the acceleration data and the origin (P0 (0, 0, 0)) (that is, the synthetic vector Vc) and the X-Y plane. When the angle φ is in a range larger than a, it is judged that the angle φ is within a set range. This shows a state where the possibility that the user US is performing a motion for viewing the display surface of the display section 112 of the electronic device 100 is high when the angle φ is in a set range indicated by a bold arrow line in FIG. 8A. Normally, when the user wears a wristwatch or a wristwatch-type device, the case is rare where the display surface of the display section 112 is oriented toward a side opposite to the gravity direction (hereinafter referred to as "the display surface is oriented upward"). The display surface is not oriented upward until the user performs a motion for viewing the display surface. Here, on the assumption that the user US is in an upright position or a seated position, the case where the user lies on his or her back or the like is not considered.

That is, when the Z axis is set perpendicular to the display surface (the X-Y plane) of the electronic device 100 and a direction from the display surface to the back surface (the downward direction in the drawing) is set as a + direction as depicted in FIG. 8A, if the back surface of the electronic device 100 is placed in contact with a horizontal plane such as on a desk, acceleration of gravity G is observed in the + direction of the Z axis. As a result, when the user US performs a motion for viewing the display surface in an upright position or a seated position, the acceleration of gravity G is observed in the + direction of the Z axis. A range for judging this state can be set with the conditional expression of $\phi>a$. Here, the result of an experiment performed by the inventor of the present invention shows that, by setting the judgment value a on the order of 0.9 radian, an operation by the user US for viewing the display surface can be favorably judged and erroneous operations are extremely decreased. Note that the judgment value a may be changed as appropriate according to the workout status of the user US and the movement status of the electronic device 100.

Regarding the above description, when, for example, the user US is performing motions or a workout such as walking and running, the acceleration of gravity G is presumed to change significantly. The results of various verifications by the inventor of the present invention shows that, by the motion of a person viewing a clock-type electronic device while walking or running, the magnitude of the acceleration of gravity G may change, but the direction thereof does not change much. Based on this result, in the present embodiment, a scheme of judging whether the values are within the set range is applied by excluding the polar coordinate component r corresponding to the strength of the acceleration of gravity G from judgment items as described above and setting the above-described conditional expression only to the angles $\phi$ and $\theta$, which are polar coordinate components regarding the tilt direction of the electronic device 100. As a result, judgment on whether or not the user US has performed a motion for viewing the display surface of the display section 112 while performing continuous motions or a workout can be favorably made.

Next, the conditional expression of $-\pi-b<\theta<b$ is described. As depicted in FIG. 7 and FIG. 8B, the angle $\theta$ formed by the X axis and a line connecting a point obtained by projecting a point representing the value (r, $\phi$, $\theta$) acquired by polar coordinate transformation of the measurement value of the acceleration data (that is, the measurement point Ps (x, y, z)) onto the X-Y plane and the origin P0 (0, 0, 0) is set at the predetermined judgment value b (<0), and the value is judged as being within the set range when the angle $\theta$ is within a range smaller than b and larger than $-\pi-b$. This shows a state where the possibility that the user US is performing a motion for viewing the display surface of the display section 112 of the electronic device 100 is high when the angle $\theta$ is in a set range indicated by a bold arrow line in FIG. 8B. Normally, when the user wears a wristwatch or a wristwatch-type device and performs a motion for viewing the display surface, the upper side of the display surface of the display section 112 (the + direction side of the Y axis of FIG. 8B) is positioned above the lower side of the display surface (the – (minus) direction side of the Y axis of FIG. 8B) with respect to the horizontal plane (the plane parallel to the sheet surface of FIG. 8B). In this case as well, on the assumption that the user US is in an upright position or a seated position, the case where the user lies on his or her back or the like is not considered.

That is, a point of the value obtained by performing polar coordinate transformation on the measurement value of the acceleration data corresponding to the acceleration of gravity G projected onto the X-Y plane is projected onto the – (minus) side of the Y axis depicted in FIG. 8B. Here, when the user US performs a motion for viewing the display surface in an upright position or a seated position, the possibility that the right side, the left side, and the lower side of the display surface depicted in FIG. 8B are positioned above the upper side of the display surface with respect to the horizontal plane is low. In consideration of this, a range for judging this state can be set not only by the condition that the angle $\theta$ is positioned simply on the – side of the Y axis but also by the conditional expression of $-\pi-b<\theta<b$. Here, the result of an experiment performed by the inventor of the present invention shows that, by setting the judgment value b on the order of –0.2 radian, the motion of viewing the display surface by the user US can be favorably judged and erroneous operations are extremely decreased. Also, as in the case of the judgment value a, the judgment value b may be changed as appropriate according the workout status of the user US and the movement status of the electronic device 100.

Next, when it is judged that the angles $\phi$ and $\theta$ serving as the polar coordinate components are within the set range in the above-described range judgment (Step S102), the control section 115 sets (resets) a "number of times of continuation out of the range", which is counted up when it is judged that the value is out of the set range in the range judgment, at 0 (Step S103). Next, the control section 115 sets (increments by 1) "the number of times of continuation within the range" (first coefficient), which is counted up when it is judged that the value is within the set range, at a numerical value obtained by adding 1 to "the number of times of continuation within the range" (Step S104).

While the user US carrying or wearing the electronic device 100 is performing a workout such as walking or running, for example, the acceleration sensor 111 detects various accelerations according to swings of the arm of the user US and the like. Accordingly, even while the user US is not performing a motion for viewing the display surface of the wristwatch serving as the electronic device 100, it may be judged that the angles $\phi$ and $\theta$ as the polar coordinate components are within the set range. Conversely, even while the user US is performing a motion for viewing the display surface of the wristwatch, it may be judged that the angles $\phi$ and $\theta$ serving as the polar coordinate components are not within the set range. Therefore, when it is judged that the angles $\phi$ and $\theta$ serving as the polar coordinate components are within the set range, if the light-emitting section 113 is immediately controlled to light up, electric power may be wastefully consumed. Even in a case where the angles $\phi$ and $\theta$ serving as the polar coordinate components are not within the set range, when the light-emitting section 113 is controlled to light off immediately, lighting off is performed even if the user US desired to see the display surface. Thus, in the present invention, lighting-up control or lighting-off control is performed on the light-emitting section 113 only when the state where the angles $\phi$ and $\theta$ serving as the polar coordinate components are within the set range and the state where the angles $\phi$ and $\theta$ are out of the set range satisfy a predetermined condition.

On the other hand, when it is judged that the angles $\phi$ and $\theta$ serving as the polar coordinate components are not within the set range in the range judgment described above (Step S102), the control section 115 sets (increments by 1) "the number of times of continuation out of the range" (a second coefficient) by adding 1 to "the number of times of continuation out of the range" at the time of the previous analysis and judgment (Step S105). Next, the control section 115 judges whether the "number of times of continuation within the range" is larger than 0 (that is, whether the number is counted up) (Step S106). When "the number of times of continuation within the range" is larger than 0, the control section 115 sets (decrements) the "number of times of continuation within the range" by decreasing "the number of times of continuation within the range" at the time of the previous analysis and judgment by 1 (Step S107). On the other hand, when "the number of times of continuation within the range" is smaller than 0, the control section 115 sets (resets) "the number of times of continuation within the range" at 0 (Step S108).

In the series of processing associated with the range judgment described above (Step S102 to S108), it is measured how many times the state where the angles $\phi$ and $\theta$ serving as the polar coordinate components of the sensor data (acceleration data) are within the set range, that is, the electronic device 100 is in a predetermined tilt state, and the state where the user US is considered to be performing a motion for viewing the display surface of the display section 112 of the electronic device 100 continuously occurs.

In this series of processing, for example, even if the angles $\phi$ and $\theta$ serving as the polar coordinate components within the set range are changed to be out of the set range, the control section 115 performs processing for decrementing the value of "the number of times of continuation within the range", instead of immediately resetting this value. As a result, if a phenomenon occurs such that the value once moves out of the set range and then immediately returns to be within the set range again, the value is not reset, and it is judged that the state within the set range continues. In other words, even if a phenomenon occurs in which the value repeatedly becomes within and out of the set range (referred herein to as "chattering" for convenience of explanation), it is continuously judged that the value is within the set range without reflecting the "chattering" state onto range judgment.

Next, after "the number of times of continuation within the range" and "the number of times of continuation out of the range" are updated and set with the series of processing associated with the range judgment described above (Step S102 to S108), the control section 115 judges whether "the number of times of continuation out of the range" is larger than a constant C (Step S109). When "the number of times of continuation out of the range" is larger than the constant C, the control section 115 sets (resets) "the number of times of continuation within the range" at 0 (Step S110).

The processing for judging "the number of times of continuation out of the range" (Steps S109 and S110) corresponds to exception handling where the value is judged as being within the set range even if it is out of the set range in the above-described "chattering" state so as to prevent reflection onto the range judgment. That is, instead of completely ignoring the above-described "chartering" state, when "the number of times of continuation out of the range" repeatedly occurs the number of times C (constant C) set in advance, the control section 115 judges that the user US is not performing a motion for viewing the display surface of the display section 112 of the electronic device 100. Specifically, the constant C applied to this processing is set as, for example, C=10, when processing for collecting, analyzing, and judging acceleration data is performed at a period of 40 Hz as described above. In this case, the processing for collecting, analyzing, and judging acceleration data has an operation interval of 25 msec. Therefore, by setting the constant C=10, if the "chattering" state continues for 25×10=250 msec, the control section 115 judges that the user US is not performing a motion for viewing the display surface of the display section 112 of the electronic device 100.

Next, in the lighting-up judging operation S140, as depicted in FIG. 6, the control section 115 first judges whether the above-described "number of times of continuation within the range" exceeds a judgment time D set in advance (Step S111). When the "number of times of continuation within the range" exceeds the judgment time D, the control section 115 judges whether the previous "continuous time" corresponding to a lighting-up or lighting-off state of the current light-emitting section 113 is "0" (Step S112).

In the processing for judging "the number of times of continuation within the range" (Step S111), the control section 115 judges whether the user US is stably performing the motion for viewing the display surface of the display section 112 of the electronic device 100. Specifically, the judgment time D applied to this processing is set as, for example, D=4, when processing for collecting, analyzing, and judging acceleration data is performed at a period of 40 Hz as described above. In this case, the processing for collecting, analyzing, and judging acceleration data has an operation interval of 25 msec. Therefore, by setting the judgment time D=4, it is judged whether the angles $\phi$ and $\theta$ serving as the polar coordinate components of the acceleration data stay within the set range for 25×4=100 msec or longer, that is, whether the user US is stably performing a motion for viewing the display surface of the display section 112 of the electronic device 100 for the judgment time or longer with the electronic device 100 being in a predetermined tilt state. As a result, for example, in the state where the display surface of the display section 112 of the electronic device 100 is accidentally oriented upward, the occurrence of an erroneous operation of lighting up the light-emitting section 113 can be prevented.

Also, while the above-described "continuous time" is set at "0" as an initial value, when the previous "continuous time" is "0" in the processing for judging the "previous continuous time" (Step S112), the control section 115 judges that the light-emitting section 113 is currently in a non-lighting-up state (lighting-off state). Then, the control section 115 sets a predetermined initial continuous time E to "the continuous time" (Step S113) to cause the light-emitting section 113 to perform a lighting-up operation (Step S114).

That is, the above-described "continuous time" is a time (lighting-up continuous time) for continuing the lighting-up state occurred when the light-emitting section 113 is once controlled to perform a lighting-up operation. Specifically, the initial continuous time E applied to this processing is set as, for example, E=280, when processing for collecting, analyzing, and judging acceleration data is performed at a period of 40 Hz as described above. In this case, the processing for collecting, analyzing, and judging acceleration data has an operation interval of 25 msec. Therefore, by setting the constant E=280, the lighting-up state continues for 25×280=7000 msec=7 sec.

On the other hand, when the previous "continuous time" is not "0" in the processing for judging the above described "previous continuous time" (Step S112), the control section 115 judges that the light-emitting section 113 is currently in a lighting-up state. Then, the control section 115 sets (decrements) the above-described "continuous time" by decreasing "the continuous time" at the time of the previous analysis and judgment by 1 (Step S115), and judges whether the resultant "continuous time" is 0 (Step S116). When the current "continuous time" is not "0" in the processing for judging "the continuous time" (Step S116), the control section 115 controls the current lighting-up state of the light-emitting section 113 to continue (Step S117). On the other hand, when "the continuous time" is "0", the control section 115 causes the light-emitting section 113 to perform a lighting-off operation (Step S118).

On the other hand, when "the number of times of continuation within the range" does not exceed the judgment time D in the above-described processing for judging "the number of times of continuation within the range" (Step S111), the control section 115 judges whether the previous "continuous time" is 0 (Step S119). Then, when the previous "continuous time" is "0", the control section 115 judges that the light-emitting section 113 is currently in a non-lighting-up (a lighting-off) state, sets "the continuous time" at "0" (Step S120), and then controls the lighting-off state of the light-emitting section 113 to continue (Step S121).

On the other hand, when the previous "continuous time" is not "0" in the processing for judging the above-described "previous continuous time" (Step S119), the control section 115 judges that the light-emitting section 113 is currently in a lighting-up state, sets (decrements) the above-described "continuous time" by decreasing the "continuous time" at the time of the previous analysis and judgment by 1 (Step S122), and then judges whether the resultant "continuous time" is 0 (Step S116). When the current "continuous time" is not "0" in the processing for judging "the continuous time" (Step S116), the control section 115 controls the current lighting-up state of the light-emitting section 113 to continue (Step S117). On the other hand, when the current "continuous time" is "0", the control section 115 causes the light-emitting section 113 to perform a lighting-off operation (Step S118).

The series of processing of the light-source control method for electronic devices described above is repeatedly performed in the data collecting operation S120 at the timing at which acceleration data is detected by the acceleration sensor 111, for example, at a period (time interval) of 40 Hz as described above.

The numerical values of the judgment values a and b, the constant C, the judgment time D, and the initial continuous time E applied to each judgment processing described in the above-described light-source control method are each merely an example of a numeral value calculated or set based on various data obtained by experiments targeted for the case where a motion for viewing the display surface of the display section 112 while walking is performed on the electronic device 100 according to the present embodiment, and the present invention is not limited to the numerical values described above. That is, the numerical values of the judgment values a and b, the constant C, the judgment time D, and the initial continuous time E applied to each judgment processing are each set as appropriate according to various conditions such as the structure of the device applied as the electronic device 100, the arrangement of the acceleration sensor, and the workout status of the user. Furthermore, these numerical values are not limited to specific numerical values, and may each have a predetermined numerical value range. In this case, the number of times (that is, time interval) of judgment processing repeatedly performed in the light-source control method is changed and set as appropriate according to a change of settings of these numerical values and numerical ranges.

As such, according to the present embodiment, even if the user US is performing motions or a workout such as walking or running, whether the electronic device 100 is in a predetermined tilt state can be accurately judged based on only acceleration data detected by the acceleration sensor provided to the electronic device 100. Therefore, based on the judgment result, the light-emitting section 113 of the electronic device 100 can be appropriately controlled to perform a lighting-up or lighting-off operation.

In particular, when the user US is performing a workout such as walking or running, it is normal that the angles $\phi$ and $\theta$ serving as polar coordinate components of the acceleration data always become within and out of the range set in advance described above. In this case, it is judged that the electronic device 100 is in a predetermined tilt state when a value within the range set in advance simply continues for a predetermined time or it is judged that the electronic device 100 is not in the predetermined tilt state when a value out of the range set in advance simply continues for a predetermined time. Conventionally, in this case, when the user US is performing a workout, the tilt state of the electronic device 100 cannot be accurately detected. That is, for example, when the user US stops a workout and is staying still, if the user US performs a motion for viewing the display surface of the display section 112 of the electronic device 100, the angles $\phi$ and $\theta$ can each continue a value within the range set in advance only for a predetermined time. However, when the user US is performing a workout, even if the user US is performing an operation for viewing the display surface, it is difficult to keep a value within the range set in advance for a predetermined time. Therefore, when a judgment is made simply on condition that a predetermined value continues for a predetermined time, the tilt state of the electronic device 100 cannot accurately be detected. Therefore, the light-emitting section 113 of the electronic device 100 cannot be appropriately controlled to perform a lighting-up or lighting-off operation based on the judgment result.

By contrast, in the present embodiment, it is possible to accurately judge whether the electronic device 100 is in a predetermined tilt state, even if the user US is performing a workout. In the present embodiment, when the angles $\phi$ and $\theta$ are within the range set in advance, "the number of times of continuation within the range" is incremented. Also, when the angles $\phi$ and $\theta$ are out of the range set in advance, "the number of times of continuation out of the range" is incremented and also "the number of times of continuation within the range" is decremented. Thus, when the angles $\phi$ and $\theta$ become out of the range, they are not immediately regarded as being out of the range. As a result, when the user US is performing a workout, the tilt state of the electronic device 100 can be more accurately detected.

Therefore, the user US can light up the light-emitting section of the display panel appropriately by a simple operation for setting the mounted electronic device to be in a predetermined tilt state without suspending or stopping motions or workout being performed, whereby high usability of the electronic device can be ensured. Also, by cancelling the tilt state described above, the light-emitting section can be lit off, whereby exhaustion of the battery of the electronic device can be mitigated. Furthermore, in the electronic device to which this tilt judging apparatus has been applied, the light-emitting section can be controlled to light up based on only the acceleration data detected by the acceleration sensor. Accordingly, a plurality of sensors or switches are not required to be provided and the number of components can be reduced, whereby the size and weight of the electronic device and the product cost can be reduced.

In the above-described embodiment, the control of turning the light-emitting section 113 of the electronic device 100 ON or OFF is performed based on a result obtained by judgment using the tilt judging method. However, the present invention is not limited thereto. That is, the present invention can be favorably applied to, for example, ON/OFF control of a display screen or a device power supply, start of application software, and data communication, as long as the electronic device detects a predetermined tilt state and controls driving of a specific function of the electronic device.

Also, in the above-described embodiment, the present invention is applied to a wristwatch or a wristwatch-type device as an electronic device. This wristwatch-type device to which the present invention can be favorably applied may be, for example, a wrist analyzer including a function of displaying workout information such as a pitch, pace, pulse count, distance traveled, and calorie consumption amount and support information (advices) regarding the workout status of the user analyzed based on the workout information. Also, the tilt judging apparatus according to the present invention is not limited to a wristwatch-type electronic device, and the present invention can be favorably applied to, for example, a portable telephone, smartphone, media player, activity amount indicator, and the like as long as it is an electronic device that is carried by the user or mounted on a specific human body part.

Moreover, in the above-described embodiment, the case is described in which a user wearing an electronic device on the wrist performs continuous motions or a workout such as running or running in a marathon. However, the present invention is not limited thereto, and can be favorably applied to even the case of, for example, performing another workout such as trekking or cycling and motions in daily life.

While the present invention has been described with reference to the preferred embodiments, it is intended that the invention be not limited by any of the details of the description therein but includes all the embodiments which fall within the scope of the appended claims.

The invention claimed is:

1. A function driving apparatus comprising:
an acceleration sensor which detects acceleration components of a device in directions of x axis, y axis, and z axis which are orthogonal to each other, at predetermined time intervals; and
a control section which transforms, at predetermined time intervals, the acceleration components detected by the acceleration sensor to polar coordinate components formed of an r component representing a distance from an origin of an xyz space, a θ component representing an angle formed with the x axis, and a φ component representing an angle formed with an xy plane including the x axis and the y axis, and drives a specific function of the device when a state in which the θ component and the φ component are within a predetermined set range continues for a predetermined time or longer,
wherein the control section judges whether the θ component or the φ component is within the predetermined set range, at predetermined time intervals; increments a first coefficient when the θ component and the φ component are within the predetermined set range; increments a second coefficient and decrements the first coefficient when the θ component or the φ component is out of the predetermined set range; and drives the specific function of the device based on a result of comparison between the first coefficient and a first preset value.

2. The function driving apparatus according to claim 1, wherein the control section resets the second coefficient when the θ component and the φ component are within the predetermined set range.

3. The function driving apparatus according to claim 2, wherein the control section resets the first coefficient based on a result of comparison between the second coefficient and a second preset value.

4. The function driving apparatus according to claim 3, wherein the control section drives the specific function of the device when the first coefficient becomes equal to or larger than the first preset value while the specific function of the device is not being driven.

5. The function driving apparatus according to claim 3, wherein the control section drives the specific function of the device and continues to drive the specific function of the device for a predetermined time, when the first coefficient becomes equal to or larger than the first preset value while the specific function of the device is not being driven.

6. The function driving apparatus according to claim 5, wherein, the control section initializes a third coefficient such that the third coefficient becomes equal to a third preset value corresponding to the predetermined driving time, when the first coefficient becomes equal to or larger than the first preset value while the specific function of the device is not being driven.

7. The function driving apparatus according to claim 6, wherein the control section decrements the third coefficient when the first coefficient becomes equal to or larger than the first preset value while the specific function of the device is being driven.

8. The function driving apparatus according to claim 6, wherein the control section decrements the third coefficient when the first coefficient becomes smaller than the first preset value while the specific function of the device is being driven.

9. The function driving apparatus according to claim 3, wherein the control section continues a state of not driving the specific function of the device when the first coefficient becomes smaller than the first preset value while the specific function of the device is not being driven.

10. The function driving apparatus according to claim 1, wherein the device comprises a display panel including a light-emitting section, and
wherein the control section controls the light-emitting section to light up when the device is judged as being in a specific tilting state based on the judgment result.

11. A function driving method comprising:
a step of detecting acceleration components of a device in directions of x axis, y axis, and z axis which are orthogonal to each other, at predetermined time intervals; and
a step of transforming, at predetermined time intervals, the acceleration components detected by an acceleration sensor to polar coordinate components formed of an r component representing a distance from an origin of an xyz space, a θ component representing an angle formed with the x axis, and a φ component representing an angle formed with an xy plane including the x axis and the y axis, and driving a specific function of the device when a state in which the θ component and the φ component are within a predetermined set range continues for a predetermined time or longer,
wherein the step of driving the specific function of the device includes a step of judging whether the θ component or the φ component is within the predetermined set range, at predetermined time intervals, a step of incrementing a first coefficient when the θ component and the φ component are within the predetermined set range, a step of incrementing a second coefficient and decrementing the first coefficient when the θ component or the φ component is out of the predetermined set range, and a step of driving the specific function of the device based on a result of comparison between the first coefficient and a first preset value.

12. A non-transitory computer-readable storage medium having stored thereon a function driving program that is executable by a computer, the program being executable by the computer to control a function driving apparatus having an acceleration sensor for detecting acceleration components of a device in directions of x axis, y axis, and z axis which are orthogonal to each other at predetermined time intervals, and to perform functions comprising:

processing for transforming, at predetermined time intervals, the acceleration components detected by the acceleration sensor to polar coordinate components formed of an r component representing a distance from an origin of an xyz space, a θ component representing an angle formed with the x axis, and a φ component representing an angle formed with an xy plane including the x axis and the y axis, and driving a specific function of the device when a state in which the θ component and the φ component are within a predetermined set range continues for a predetermined time or longer, wherein the processing for driving the specific function of the device includes processing for judging whether the θ component or the φ component is within the predetermined set range, at predetermined time intervals, processing for incrementing a first coefficient when the θ component and the φ component are within the predetermined set range, processing for incrementing a second coefficient and decrementing the first coefficient when the θ component or the φ component is out of the predetermined set range, and processing for driving the specific function of the device based on a result of comparison between the first coefficient and a first preset value.

* * * * *